Figure 1:
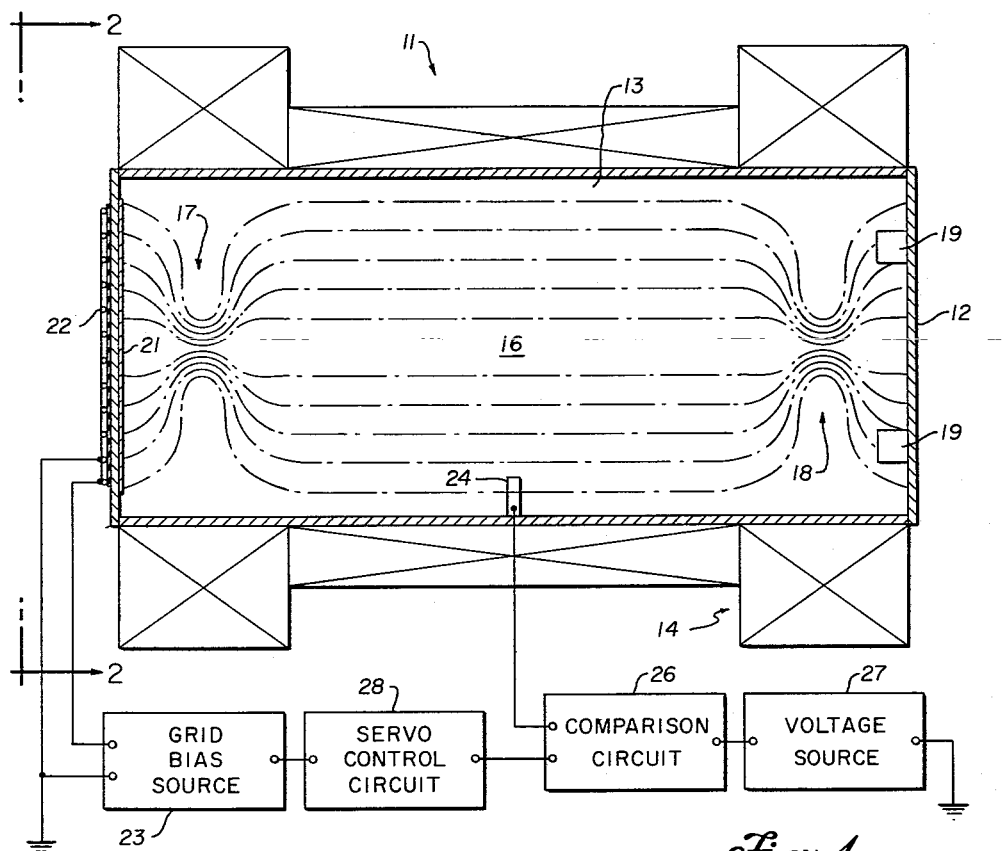

Oct. 3, 1961          R. F. POST          3,003,080
APPARATUS FOR MINIMIZING ENERGY LOSSES FROM
MAGNETICALLY CONFINED VOLUMES
OF HOT PLASMA
Filed May 27, 1959

INVENTOR.
RICHARD F. POST
BY
ATTORNEY.

United States Patent Office 3,003,080
Patented Oct. 3, 1961

3,003,080
APPARATUS FOR MINIMIZING ENERGY LOSSES FROM MAGNETICALLY CONFINED VOLUMES OF HOT PLASMA
Richard F. Post, Walnut Creek, Calif., assignor to the United States of America as represented by the United States Atomic Energy Commission
Filed May 27, 1959, Ser. No. 816,351
6 Claims. (Cl. 315—117)

The present invention relates generally to the control of energy losses from magnetically confined volumes of hot plasma, and more particularly to method and means for controlling the electron temperature in a plasma commensurate with minimum energy losses therefrom.

The magnetic confinement of energetic or hot plasma has recently become of importance in the field of nuclear physics. Verious apparatus and methods have arisen for effecting such plasma confinement and prominent among the foregoing are those disclosed in my copending application, Serial No. 443,447. As disclosed therein an axially symmetric magnetic field having axially spaced gradientially intensified magnetic reflector field regions situated therein is provided to radially and axially confine a body of plasma and to effect various manipulations therein such as heating of the plasma constituents to high kinetic temperatures. Devices characterized by such magnetic field configuration are termed and have become popularly known as pyrotrons. By virtue of the substantial heating imparted to the plasma confined by the non-material medium of the magnetic field, pyrotrons possess manifold utility heretofore unrealizable. Pyrotrons may be employed, for example, to heat plasma to elevated kinetic temperatures whereat various nuclear reactions occur between the plasma constituents which are productive or nuclear radiation such as neutrons, X-rays, and the like. Such temperatures are also conducive to the initiation and production of various chemical reactions between the plasma constituents. Magnetically confined bodies of energetic plasma may also be employed in conjunction with electrostatic extraction structure as a source of energetic ions or electrons, magnetically confined bodies of plasma of the foregoing type thus possessing substantial utility in the source art. One further use of pyrotrons contemplates the establishment of plasma density and temperature conditions commensurate with the initiation and promotion of controlled thermonuclear reactions.

In order that pyrotrons as well as other plasma confinement devices may be employed for the foregoing uses and other applications with optimum efficiency it is exceedingly important that losses of energy from the hot plasma be reduced to the maximum extent possible. Failure to control the energy losses seriously detracts from the maximum attainable temperature of the plasma ions. Basically the loss of energy from a body of hot plasma confined, for example, in a pyrotron magnetic containment field is predominantly due to the loss of charged particles, i.e., ions and electrons, from the plasma as well as the damping in energy of the plasma ions due to dynamical friction with the electrons. These losses are extensively influenced by the kinetic temperature of the plasma electrons. More particularly, the loss of charged particles results primarily from ambipolar effects which arise from inherently different rates of ion and electron velocity-space diffusion (i.e., diffusion of particles which after undergoing coulomb collisions direct their velocity vectors sufficiently close to the direction of the magnetic containment field lines to be no longer bound thereby and therefore escape). The initial rate of diffusion of electrons is much greater than that of the ions, and therefore a positive space-charge potential is established in the plasma. The magnitude of the potential is just sufficient to equalize the net loss rate of the electrons and ions. Hence the loss rate of electrons is retarded whereas the loss rate of ions is increased. It may be shown that the increased ion loss rate is a function of the ratio of the electron kinetic temperature to the ion kinetic temperature. The kinetic temperature of the plasma electrons is thus a controlling factor in the ion loss rate and should be as low as practically possible in order to reduce the ion diffusion losses. The damping in ion energy by electron-ion collisions (dynamical friction), however, increases as the electron kinetic temperature decreases with respect to the ion kinetic temperature. This is due to the energy transfer by collision being from the most to the least energetic particle. The effectiveness of ion energy damping by collision with electrons may be expressed in terms of an $e$-folding time, required to reduce the energy of an energetic ion to approximately 37% of its original value when colliding with an electron distribution of fixed temperature. When such $e$-folding time is much larger than the mean containment time of an ion in the magnetic containment field, then electron-ion collisions do not appreciably reduce the ion energies. The $e$-folding time, however, is related to the electron kinetic temperature by a three-halves power function. Accordingly, in order that energy losses due to electron-ion collisions be minimized, large plasma electron temperatures are required. Inasmuch as the energy losses due to ambipolar effects and electron-ion collisions respectively oppositely vary with reference to electron kinetic temperature the total of such losses is a minimum at an optimum equilibrium electron kinetic temperature intermediate the low and high temperature values where the ambipolar losses and collisional losses are respectively minimum. I have found that the optimum equilibrium temperature is lower than the range of equilibrium temperatures in a heated plasma and accordingly in order to minimize the overall energy losses the temperatures of the plasma electrons must be appropriately continuously reduced and regulated to establish and maintain the optimum equilibrium temperature.

In order to minimize the overall power losses from a magnetically confined body of hot plasma the present invention provides method and apparatus for establishing and maintaining an optimum equilibrium temperature of the plasma electrons by controlled injection of relatively cold electrons into the contained plasma volume. The cool electrons reduce the normal plasma electron equilibrium temperature to the optimum temperature and the quantity of cold electrons injected is continuously controlled in direct proportion to the instantaneous plasma electron equilibrium temperature such that same is continuously regulated to the optimum value.

It is therefore an object of the present invention to minimize losses of ion energy from a magnetically confined body of hot plasma.

Another object of this invention is to provide a method and apparatus for controlling the kinetic temperature of electrons in a plasma commensurate with minimum losses of ion energy therefrom.

A further object of the present invention contemplates the conduction of controlled nuclear reactions in a pyrotron with minimum reactor power losses therefrom.

Figure 2:
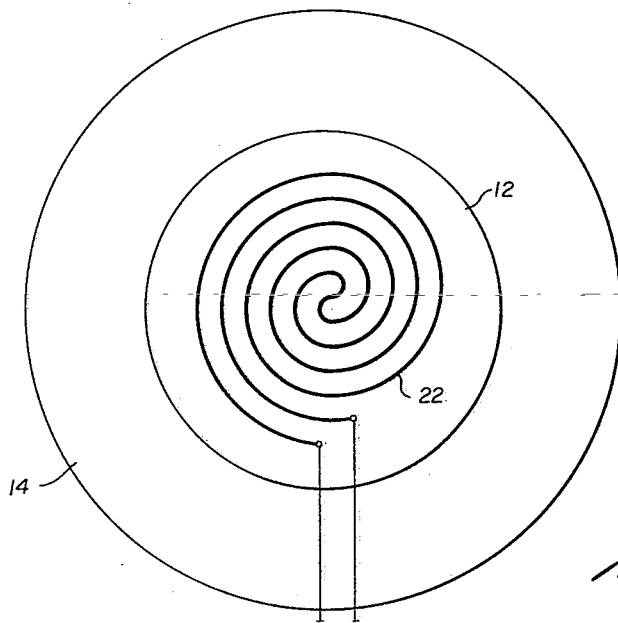

Additional objects and advantages of the invention will become apparent by consideration of the following description taken in conjunction with the accompanying drawing, of which:

FIGURE 1 is a cross-sectional elevation view of a pyrotron partially in schematic and embodying an electron temperature control system in accordance with the present invention; and FIGURE 2 is a cross-sectional view taken along the line 2—2 of FIGURE 1 and illustrating particularly the magnetic grid structure of the temperature control system.

Considering now the invention in some detail and referring to the illustrated form thereof in the drawing there is provided a pyrotron 11 of the type disclosed in my copending application, Serial No. 443,447, and including a temperature control system in accordance with the present invention. Basically pyrotron 11 includes a vacuum housing 12 enclosing a low pressure region 13 and having solenoid means 14 disposed concentrically thereabout to establish an axially symmetric magnetic containment field as depicted by the phantom lines in FIGURE 1 within the low pressure region. The containment field includes a substantially uniform central field region 16 terminally bounded by gradientially-intensified reflector field regions 17, 18 in the end portions of low pressure region 13. Plasma injection means 19 are provided, for example, at one end of housing 12, for injecting plasma into central field region 16 wherein such plasma is confined between the reflector field regions 17, 18 and may be heated to high temperatures by various processes disclosed in the above-referenced copending appliction for a pyrotron. A body of hot plasma may thus be confined in the central field region 14 in order to produce various nuclear reactions productive of nuclear radiation between the energetic plasma constituents or for other purposes such as disclosed in said copending application. Inasmuch as the normal electron equilibrium temperature in the plasma is higher than an optimum equilibrium electron temperature at which minimum energy losses from the plasma ions occur by ambipolar effects and dynamical friction, the loss of ion energy from the confined plasma volume is excessive. In accordance with the present invention, however, the plasma equilibrium electron temperature is continuously controlled by injecting controlled amounts of relatively low temperature, i.e., low energy, electrons in the plasma as confined within the low pressure region 13 by the magnetic containment field. The quantity of low temperature electrons injected is continuously directly related to the equilibrium plasma electron temperature such that same is reduced and thereafter regulated to the optimum equilibrium temperature at which minimum ion energy losses occur.

In order to accomplish the foregoing, cool electrons are introduced to the plasma in any appropriate manner, such as by admitting ionizable gas thereto from a gas leak, occluded gas source, or the like whereby the gas is ionized in the plasma to produce ions and cool electrons in quantities dependent upon the amount of gas introduced. More preferably, cool electrons are directed into the plasma from an electron emitter or equivalent means disposed outwardly adjacent one of the reflector field regions 17 near the containment field axis such that the electrons are able to penetrate the reflector field region thereat and enter the central field region 16 confining the body of plasma. The cool electrons of whatever origin reduce the electron equilibrium kinetic temperature in the plasma confined in region 16 in proportion to the quantity of injected cool electrons. The plasma electron equilibrium temperature is continuously sensed and the quantity or flow of injected cool electrons is responsively directly controlled, as by means of a valve where the gas is employed as the source of electrons or a grid where the electrons are introduced directly in their charged state, until such time as an equilibrium electron temperature commensurate with minimum ion energy losses is attained. At such optimum temperature no more cool electrons are injected into the central field region 16 until a difference between the plasma electron equilibrium temperature and the optimum equilibrium temperature again occurs.

Considering now preferred apparatus for accomplishing the foregoing control of electron temperature in the plasma contained within central field region 16, the source of low temperature electrons is best provided as a secondary electron emitting coating 21, e.g., barium oxide, deposited upon one end closure plate of vacuum housing 12 centrally axial therewith. Plasma electrons continuously escaping from central field region 16 by penetrating reflector field region 17 near the axis thus impinge upon the secondary emission coating 21. The escaping plasma electrons upon impinging the secondary emission coating 21 induce the emission of secondary electrons therefrom in copious quantities into low pressure region 13. Such secondary electrons penetrate the reflector field region 17 near the axis to thus enter the plasma within central field region 16 and reduce the plasma electron temperature as described hereinbefore.

In order to control the quantity of secondary electrons emitted into region 13 a magnetic grid 22 of the type disclosed in my copending application, Serial No. 682,265, which has been abandoned, and in the continuation-in-part application thereof, Serial No. 835,158, which matured into U.S. Patent No. 2,947,902 on August 2, 1960, is disposed exteriorly adjacent the closure plate in insulated relation thereto and coaxial with coating 21. Such grid 22 is generally provided as a grid conductor having substantially parallel-spaced sections adjacent each other and extending in opposite directions such that current flowing through the conductor produces magnetic fields that are additive between the conductor sections. The grid may be, for example, formed as a planar double spiral of electrically conducting wire as best shown in FIGURE 2. The additive magnetic fields established on passing current through grid 22 describe generally arcuate paths extending from between the spaced grid conductor portions through the closure plate and coating 21 into the low pressure region 13 and then back to the coating. The magnetic field of grid 22 is only locally established adjacent the surface of coating 21 with no net magnetic field being produced within the low pressure region 13. Inasmuch as the grid field has flux line portions in a plane transverse to the axis of housing 12 the secondary electrons emitted from coating 21 cross such flux line portions and are deflected along paths encircling the flux lines back to the coating 21. The quantity of secondary electrons which are sufficiently deflected to prevent penetration of reflector field region 17 is dependent upon the intensity of the local magnetic field established by grid 22, which in turn is a function of the current energizing same. The electron equilibrium temperature within the plasma contained in central field region 16 is thus controlled by the magnitude of current applied to grid 22. It will be appreciated that although the electrons escaping from central field region 16 through reflector field region 17 also cross the flux lines of the local field of grid 22, such plasma electrons are substantially unaltered due to their relatively high energy as well as the local disposition of the grid field closely adjacent surface 21.

In order that the quantity of cool secondary electrons injected into the plasma within central field region 16 be such as to establish the optimum equilibrium electron temperature commensurate with minimum ion energy losses from the plasma, the grid energizing current is supplied by a controlled grid bias source 23 connected thereto and regulated in response to the electro equilibrium temperature within the plasma. The grid bias source 23 may comprise, for example, a source of constant current having a variable resistance series connected between the constant current source and the grid, the resistance of which variable resistor may be automatically controlled.

In order that the grid bias source 23 may be controlled relative to the electron equilibrium temperature of the plasma within central field region 16 means are provided for developing a signal proportional to such equilibrium temperature. More particularly an electron kinetic temperature or energy detector 24, for example, a microwave radiometer, is disposed centrally of low pressure region 13 radially outward from the confined plasma within central field region 16. Detector 24 continuously determines the mean electron kinetic temperaure in central field region 16 and converts such temperature to a corresponding electrical signal. The detector is connected to one input of a comparison circuit 26, for example, a conventional difference amplifier, the other input of which is energized by a reference voltage source 27 coupled thereto. Reference voltage source 27 produces a variable output voltage which is adjustable to a voltage value corresponding to the predetermined optimum electron temperature at which minimum ion energy losses occur from the plasma. Differences between the equilibrium temperature existing in the plasma within central field region 16 as determined by detector 24 and the optimum temperature corresponding to the predetermined output voltage from reference source 27 thus appear as an error voltage signal at the output of comparison circuit 26. The error voltage signal thus follows the change in electron equilibrium temperature within the plasma effected by injection of cool electrons from coating 21 and is zero when the equilibrium temperature is equal to the predetermined optimum temperature. The error voltage signal from comparison circuit 26 is applied to a servo control circuit 28 coupled thereto and which is in turn coupled to the grid bias source 23 to control the output current therefrom in inverse relation to the error signal.

In operation with a hot plasma confined in central field region 16 of pyrotron 11, the detector 24 develops a signal indicative of the plasma equilibrium electron temperature and such signal is compared in comparison circuit 26 to the optimum electron temperature signal generated by reference source 27. The error voltage signal indicative of the difference between the actual electron equilibrium temperature in the plasma and the desired equilibrium temperature as appears at the output of comparison circuit 26 is applied to servo control circuit 28 and this latter circuit controls the current output of grid bias source 23 in inverse relation to the error signal. Such current flowing through magnetic grid 22 in turn controls the quantity of secondary electrons emitted from coating 21 directed through reflector field region 17 into the plasma within central field region 16. Thus as the electron temperature in the plasma increases with respect to the optimum temperature whereby the ion energy losses due to ion electron collisions seriously increases, the error voltage signal correspondingly increases and servo control circuit 28 responsively decreases the bias current applied to grid 22. The intensity of the local magnetic field established by grid 22 at the surface of coating 21 is thus correspondingly reduced to permit an increased quantity of cool secondary electrons to penetrate the reflector field region 17 and enter the central field region 16 confining the plasma. This increased quantity of cool secondary electrons is sufficient to reduce the equilibrium kinetic temperature of the plasma electrons confined within central field region 16 to a value approaching the optimum equilibrium electron temperature. The quantity of injected cool secondary electrons is continuously regulated in this manner until the plasma equilibrium electron temperature is equal to the desired optimum temperature at which time the error voltage appearing at the output of comparison circuit 26 is zero. With zero error voltage signal servo control circuit 28 correspondingly adjusts grid bias source 23 to produce maximum grid bias current whereby maximum grid field is established adjacent coating 21 and substantially all secondary electrons emitted therefrom are deflected and do not penetrate reflector field region 17. The equilibrium electron temperature within the plasma confined in central field region 16 may thereafter increase whereupon an error voltage signal is again developed at the output of comparison circuit 26. In response to the error voltage, servo control circuit 28 hence adjusts the output of grid bias source 23 to correspondingly reduce the grid bias current applied to grid 22 whereby the local field thereby established is also reduced. A corresponding quantity of secondary electrons emitted from surface 21 are able to penetrate reflector field region 17 and enter the plasma within central field region 16 to reduce the electron temperature therein. Thus in accordance with the present invention the equilibrium kinetic electron temperature in the plasma is continuously regulated in the foregoing manner to a value at all times closely approaching the optimum value commensurate with minimum ion energy losses from the plasma.

There has been described above a novel method and apparatus for controlling electron kinetic temperature in a magnetically confined high temperature plasma having a wide range of utility in a multitude of possible structural variations within the scope of the invention, and thus it is not intended to limit the present invention by the foregoing description but instead reference is made to the following claims for a precise delineation of the invention.

What is claimed is:

1. Apparatus for controlling the electron temperature in a magnetically confined volume of plasma which is supplied with sufficient energy to maintain said plasma at a temperature no less than a desired operating temperature comprising means for injecting relatively low energy electrons into the plasma in controllable quantities, and means for sensing departures in the plasma equilibrum electron temperature above a predetermined value and coupled to said last named means to control the quantity of injected electrons in direct relation to said departures whereby the plasma equilibrium electron temperature at all times approaches said predetermined value.

2. Apparatus for minimizing energy losses from magnetically confined plasma which is supplied with sufficient energy to maintain said plasma at a temperature no less than a desired operating temperature comprising a source of electrons for directing low energy electrons into said plasma, electron flow control means for regulating the quantity of electrons directed into said plasma in accordance with an applied control bias, electron kinetic temperature sensing means for detecting the equilibrium kinetic temperature of electrons in said plasma and generating a signal proportional to the departure of the equilibrium temperature above a predetermined optimum equilibrium temperature at which minimum energy losses from the plasma occur, and means coupled to said sensing means and responsive to the signal therefrom for continuously adjusting the control bias of said electron flow control means to regulate the quantity of low energy electrons directed into the plasma in direct relation to said signal.

3. In a device for magnetically confining a plasma which is supplied with sufficient energy to maintain said plasma at a temperature no less than a desired operating temperature, the improvement comprising a low energy electron source disposed to direct low energy electrons into said plasma, a grid for controlling the flow of said low energy electrons in inverse relation to bias applied thereto, a controllable grid bias source connected in energizing relation to said grid, an electron kinetic temperature detector for sensing the equilibrium kinetic temperature of electrons in said plasma and developing an electrical signal proportional thereto, a reference source for producing a signal proportional to a predetermined optimum electron temperature, comparison means connected in receiving relation to said detector and said reference source for developing an error signal continuously indicative of the difference between the actual and predetermined optimum equilibrium electron temperature, and servo control means responsively connected to said comparison means for controlling the output of said grid bias source in inverse relation to said error signal.

4. In a device as defined by claim 3, the improvement further defined by said grid being a magnetic grid comprising a grid conductor for traversal by bias current and having substantially parallel-spaced sections adjacent each other and extending in opposite directions disposed in a plane transverse to the direction of electron flow from the source to the plasma, said grid producing additive magnetic deflection fields between the conductor sections with flux line portions in a plane transverse to the path of electrons from said low energy electron source and of a strength directly proportional to the magnitude of bias current flowing through said grid conductor whereby the low energy electrons are deflected from paths entering said plasma in quantities directly related to the magnitude of said bias current.

5. In a device as defined by claim 3, the improvement further defined by said low energy electron source comprising a secondary electron emitting surface disposed exteriorly of said plasma in receiving relation to plasma electrons escaping therefrom whereby the emission of low energy secondary electrons from said surface is induced by the impingement of the escaping relatively high energy plasma electrons thereon.

6. In a device for controlling the equilibrium electron temperature in a plasma which is supplied with sufficient energy to maintain said plasma at a temperature no less than a desired operating temperature and which is confined within the central field region terminally bounded by gradientially-intensified reflector field regions of an axially symmetric magnetic containment field established in a low pressure region enclosed by a vacuum housing, the combination comprising a secondary electron emissive surface interiorly disposed upon one transverse end closure of said vacuum housing centrally coaxially outward from the proximal one of said reflector field regions, a magnetic grid defined by a continuous planar double spiral of electrical conductor for traversal by an electric current disposed exteriorly adjacent said first end closure and centrally coaxial therewith, a controllable grid current source connected in series with the conductor of said grid, an electron kinetic temperature detector disposed adjacent the plasma confined within the central field region of said containment field for generating an electrical signal proportional to the equilibrium kinetic temperature of the plasma electrons, a reference source for generating a signal proportional to a predetermined optimum equilibrium electron temperature, comparison means connected in receiving relation to said detector and said reference source for generating an error signal proportional to the difference between the actual electron temperature signal and the optimum electron temperature signal, and servo control means responsively connected to said comparison means and coupled in controlling relation to said grid current source for controlling the output current therefrom in inverse relation to said error signal.

References Cited in the file of this patent
UNITED STATES PATENTS

| | | |
|---|---|---|
| 2,191,595 | Spencer | Feb. 27, 1946 |
| 2,507,652 | Smith | May 16, 1950 |
| 2,826,709 | Von Ardenne | Mar. 11, 1958 |
| 2,831,996 | Martina | Apr. 22, 1958 |

OTHER REFERENCES

Project Sherwood, by Amasa S. Bishop. Addison-Wesley Publishing Company, Reading, Massachusetts. First printing September 1958, pages 82, 83, 84, 148–151.